(12) United States Patent
Lindemark et al.

(10) Patent No.: US 12,445,028 B2
(45) Date of Patent: Oct. 14, 2025

(54) TOOL AND METHOD FOR ASSEMBLING ROTARY MACHINE RESOLVER AND ROTARY MACHINE WITH KEYLESS RESOLVER

(71) Applicant: Volvo Car Corporation, Gothenburg (SE)

(72) Inventors: Tobias Lindemark, Gothenburg (SE); Hsingcheng Lin, Taiwan (CN)

(73) Assignee: Volvo Car Corporation, Gothenburg (SE)

( * ) Notice: Subject to any disclaimer, the term of this patent is extended or adjusted under 35 U.S.C. 154(b) by 527 days.

(21) Appl. No.: 18/083,706

(22) Filed: Dec. 19, 2022

(65) Prior Publication Data

US 2023/0198361 A1 Jun. 22, 2023

(30) Foreign Application Priority Data

Dec. 21, 2021 (CN) .......................... 202123231760.8

(51) Int. Cl.
*H02K 24/00* (2006.01)
*H02K 11/21* (2016.01)
*H02K 15/00* (2006.01)

(52) U.S. Cl.
CPC ............. *H02K 24/00* (2013.01); *H02K 11/21* (2016.01); *H02K 15/00* (2013.01)

(58) Field of Classification Search
CPC ........ H02K 15/00; H02K 7/106; H02K 15/16; H02K 15/14; H02K 11/21; H02K 11/225; H02K 5/1732; H02K 24/00
See application file for complete search history.

(56) References Cited

U.S. PATENT DOCUMENTS 8,492,946 B2 * 7/2013 Vedy .................... H02K 1/28
310/68 B

* cited by examiner

*Primary Examiner* — Leda T Pham
(74) *Attorney, Agent, or Firm* — Clements Bernard Walker; Christopher L. Bernard

(57) ABSTRACT

A resolver which includes a resolver rotor and a resolver stator, the resolver rotor being assembled by: applying a DC voltage across at least one phase of windings the electric machine to create a static magnetic field by a DC electric current flowing through the at least one phase of windings of the three-phase windings, the static magnetic field forcing a machine rotor to rotate to an angular orientation where an N-S direction of magnets of the machine rotor is aligned with an N-S direction of the static magnetic field and keeping the machine rotor stably in this angular orientation; and pushing the resolver rotor onto a machine shaft in an axial direction in a state that the machine rotor is kept in the angular orientation by the static magnetic field.

12 Claims, 2 Drawing Sheets

TOOL AND METHOD FOR ASSEMBLING ROTARY MACHINE RESOLVER AND ROTARY MACHINE WITH KEYLESS RESOLVER

CROSS-REFERENCE TO RELATED APPLICATION

The present disclosure claims the benefit of priority of Chinese Patent Application No. 202123231760.8, filed on Dec. 21, 2021 and entitled "Tool for Assembling Rotary Machine Resolver and Rotary Machine", which is hereby incorporated by reference in its entirety.

TECHNICAL FIELD

The disclosure relates to a tool and method for assembling a resolver of an electric machine and an electric machine comprising a resolver rotor which is assembled to a machine shaft in a keyless manner by using the tool or method of the disclosure.

BACKGROUND

An electric machine is generally equipped with a resolver, also called "angle sensor", for sensing the rotation angle of the machine shaft. The resolver comprises a resolver rotor fixed to the machine shaft and a resolver stator fixed to the machine casing. As the resolver rotor rotates with the machine shaft, the change in the magnetic field of the resolver rotor is detected by the resolver stator, and the rotation angle of the machine shaft is thus sensed.

In order that the rotation angle of the machine shaft can be sensed in a high accuracy, the precision of the relative angular position between the resolver rotor and the machine shaft (or the machine rotor) must be ensured during the assembling of the resolver. An error in the relative angular position between the resolver rotor and the machine shaft will result in a few degrees of offset in the signal sensed from the resolver rotor with respect to the back electromotive force of the rotary machine. The degrees of offset shall be controlled to be within a tolerance range, or otherwise shall be calibrated by software.

For setting the relative angular position between the resolver rotor and the machine shaft, a typical assembling process comprises arranging a key coupling structure between the resolver rotor and the machine shaft. In this assembling process, the resolver rotor and the machine shaft are each formed with a key groove, which causes an increased cost. In addition, the number of links of tolerance chain is increased due to the key coupling structure, which negatively affects the sensing accuracy of the angular position. Manufacturing cost is also increased by measures which are necessary for controlling the precision of the tolerance chain.

SUMMARY

An object of the disclosure is to provide a solution for assembling a resolver in an electric machine to avoid the using of a key coupling structure and to increase the sensing accuracy of the angular position.

According to an aspect of the disclosure, there provides a tool for assembling a resolver of an electric machine, said electric machine comprising a casing, a machine rotor, a machine shaft, a machine stator comprising three-phase windings and a resolver that comprises a resolver rotor and a resolver stator, said tool comprising:

a DC voltage applying device configured to apply a DC voltage across at least one phase of windings of the three-phase windings to create a static magnetic field by a DC electric current flowing through the at least one phase of windings, the static magnetic field being able to force the machine rotor to rotate to an angular orientation where an N-S direction of magnets of the machine rotor is aligned with an N-S direction of the static magnetic field and to keep the machine rotor stably in the angular orientation; and a pressing device configured to push the resolver rotor onto the machine shaft in an axial direction in a state that the machine rotor is kept in the angular orientation by the static magnetic field.

In an embodiment, the DC voltage applying device comprises a DC power source and connection cables extending from the DC power source, the connection cables being configured to be connected across at least one phase of windings of the three-phase windings to apply the DC voltage across the at least one phase of windings.

In an embodiment, the DC voltage applying device is configured to cut off the DC voltage after the resolver rotor is fixed to the machine shaft.

In an embodiment, the pressing device comprises:

a seat configured to be fixed to the casing and comprising a feature to keep the resolver rotor inside it in a predetermined angular position; and a push bar arranged to face towards the resolver rotor and configured to move in the axial direction to push the resolver rotor onto the machine shaft.

In an embodiment, the seat is molded to the resolver rotor and is locked temporarily to the casing with the resolver rotor, and the resolver rotor is configured to be pushed out from the seat by the push bar.

According to another aspect of the disclosure, there provides a method for assembling a resolver of an electric machine, said electric machine comprising a casing, a machine rotor, a machine shaft, a machine stator comprising three-phase windings and a resolver that comprises a resolver rotor and a resolver stator, said method comprising the steps of:

(a) applying a DC voltage across at least one phase of windings of the three-phase windings to create a static magnetic field by a DC electric current flowing through the at least one phase of windings of the three-phase windings, and the static magnetic field forcing the machine rotor to rotate to an angular orientation where an N-S direction of magnets of the machine rotor is aligned with an N-S direction of the static magnetic field and keeping the machine rotor stably in this angular orientation;

(b) pushing the resolver rotor onto the machine shaft in an axial direction and forming press-fitting between the resolver rotor and the machine shaft in a state that the machine rotor is kept in the angular orientation by the static magnetic field; and (c) assembling the resolver stator into the casing in a predetermined angular orientation to a position surrounding the resolver rotor, the predetermined angular orientation of the resolver stator being ensured by an alignment feature provided between the resolver stator and the casing.

In an embodiment, the alignment feature comprises a poka-yoke design.

According to yet another aspect of the disclosure, there provides an electric machine which comprises:
- a casing;
- a machine shaft;
- a machine rotor fixedly carried by the machine shaft, the machine rotor comprising one or more magnets;
- a machine stator arranged in the casing surrounding the machine rotor, the electric machine stator comprising three-phase windings; and
- a resolver comprising a resolver rotor fixed to the machine shaft and a resolver stator fixedly mounted to the casing and surrounding the resolver rotor, the resolver being assembled through the following steps:
  - (a) applying a DC voltage across at least one phase of windings of the three-phase windings to create a static magnetic field by a DC electric current flowing through the at least one phase of windings of the three-phase windings, the static magnetic field forcing the machine rotor to rotate to an angular orientation where an N-S direction of the magnets of the machine rotor is aligned with an N-S direction of the static magnetic field and keeping the machine rotor stably in this angular orientation; and
  - (b) pushing the resolver rotor onto the machine shaft and forming press-fitting between the resolver rotor and the machine shaft in an axial direction in a state that the machine rotor is kept in the angular orientation by the static magnetic field;
- wherein the resolver stator is assembled into the casing in a predetermined angular orientation to a position surrounding the resolver rotor, the predetermined angular orientation of the resolver stator being ensured by an alignment feature provided between the resolver stator and the casing.

The electric machine is either an electric motor or an electric generator.

In an embodiment, the alignment feature comprises a poka-yoke design.

In an embodiment, the casing comprises a cylindrical portion and an end cover fixed to the cylindrical portion, the end cover comprising a plate portion and a tubular portion, and the resolver stator being assembled in the tubular portion.

In all embodiments of the disclosure, no form fit structure is provided between the machine shaft and the resolver rotor.

According to the assembling solution of the disclosure, the resolver rotor is press-fitted to the machine shaft, without any key coupling structure therebetween, so it does not need to form a key groove on each of the resolver rotor and the machine shaft. Further, the number of links of tolerance chain is decreased due to the cancellation of the key coupling structure, which results in increasing the sensing accuracy of the angular position. Furthermore, angular orientation of the machine shaft is achieved under the action of a static magnetic field generated by a DC voltage applied to the windings of the rotary machine, high precision of the relative angular position between the machine shaft and the resolver rotor can be ensured and sensing accuracy of the angular position can be additionally increased.

BRIEF DESCRIPTION OF THE DRAWINGS

Some embodiments of the disclosure will be described in details with reference to the drawings in which.

DETAILED DESCRIPTION

The disclosure in general relates to a technique for assembling a resolver of an electric machine, and in particular, to a tool and method for assembling a resolver of an electric machine. The disclosure also relates to an electric machine with a resolver assembled by using the tool or method of the disclosure. The electric machine of the disclosure includes both an electric generator and an electric motor.

Figure 1:
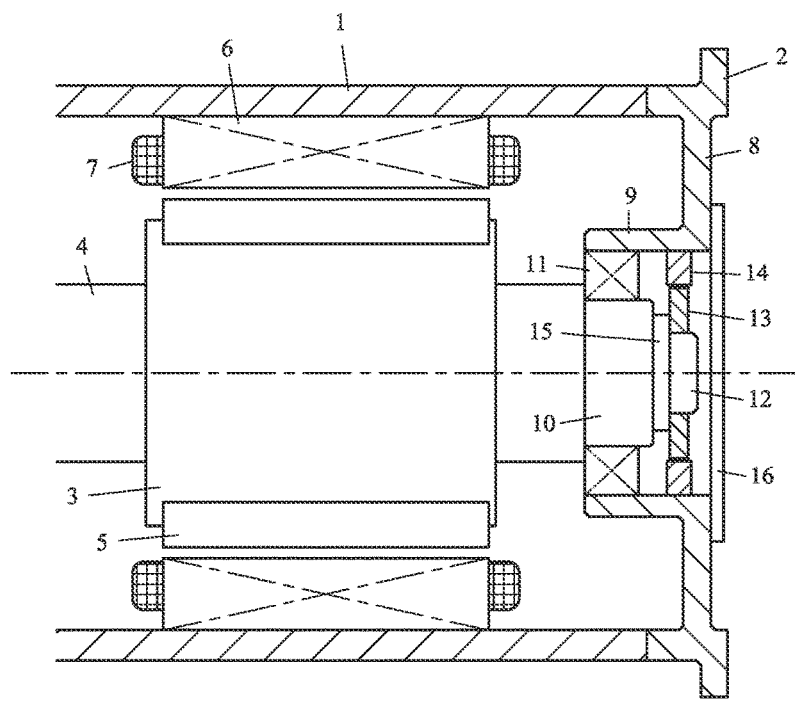
FIG. 1 is a schematic sectional view of an exemplary structure of an electric machine of the disclosure.

FIG. 1 shows an exemplary structure of an electric machine of the disclosure.

The electric machine comprises a casing (not completely shown in FIG. 1), the casing including a cylindrical portion 1 and an end cover 2. The end cover 2 is assembled to an axial end of the cylindrical portion 1.

The rotary machine further comprises a machine rotor 3 and a machine shaft 4. The machine shaft 4 is arranged in the casing in an axial direction, and the machine rotor 3 is fixed around the machine shaft 4 for driving the machine shaft 4 to rotate. A pair of radially opposed magnets 5 are carried by the machine rotor 3.

A machine stator 6 is arranged in the casing surrounding the machine rotor 3. The machine stator 6 comprises three-phase windings 7 wrapped in a stator core.

The end cover 2 comprises a substantially circular plate portion 8 and a tubular portion 9. A peripheral portion of the plate portion 8 is fixed to the axial end of the cylindrical portion 1, for example, by screws. The tubular portion 9 extends axially from an inner peripheral edge of the plate portion 8 into the interior of the casing. The machine rotor 3 comprises a bearing segment 10 rotatably supported in the tubular portion 9 by a bearing 11. The machine rotor 3 further comprises an end segment 12 extending distally from the bearing segment 10 and having a diameter smaller than that of the bearing segment 10.

The rotary machine further comprises a resolver for sensing the rotation angle of the machine shaft 4 (i.e., the rotation angle of the machine rotor 3). The resolver comprises a resolver rotor 13 fixed around the end segment 12 and a resolver stator 14 surrounding the resolver rotor 13. For facilitating the locating of the resolver rotor 13 on the end segment 12 in the axial direction, a shoulder 15 is formed between the end segment 12 and the bearing segment 10. The resolver stator 14 is fixedly mounted in the tubular portion 9. The resolver is sealed in the tubular portion 9 by a cover plate 16 fixed to the plate portion 8.

An assembling tool configured according to the disclosure, especially for assembling a resolver of electric machine, is used here to press-fit the resolver rotor 13 to the end segment 12, that is to say, to form a fixed coupling between the resolver rotor 13 and the machine shaft 4 by means of interference fit. As a result, it does not need a traditional key coupling structure or other form fit structures between the resolver rotor 13 and the machine shaft 4.

It should be noted that the traditional key coupling structure provides both fixation between the resolver rotor 13 and the machine shaft 4 and relative angular orientation therebetween. When the traditional key coupling structure is not used, relative angular orientation between the resolver rotor 13 and the machine shaft 4 must be endured in other ways.

For achieving the relative angular orientation, the assembling tool of the disclosure comprises a DC voltage applying device which is configured to, during the assembling of the resolver rotor 13 to the machine shaft 4, apply a direct current to at least one phase of windings of the three-phase windings 7 to generate a static magnetic field which helps to fix the resolver rotor 13 to the machine shaft 4 in a correct angular orientation.

As can be understood by a skilled person in the art, each phase of windings of the three-phase windings 7 carried by the machine stator 6 comprises a number of windings wrapped around teeth of the stator core. The three-phase windings 7 are electrically coupled in either a star connection configuration or a delta connection configuration. Alternatively or additionally, switches can be used for shifting between the star connection configuration and the delta connection configuration.

A static magnetic field can be generated when the DC voltage applying device applies a direct current through one phase of windings or two phases of windings of the three-phase windings 7.

Figure 2:
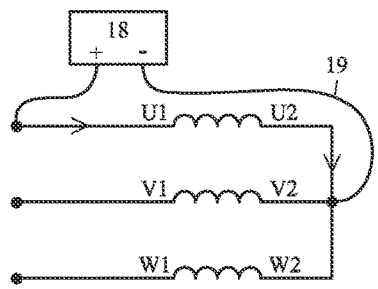
FIGS. 2 and 3 are schematic diagrams showing two possible manners of applying a DC voltage to the windings of the rotary machine during the assembling process of the electric machine.
Figure 3:
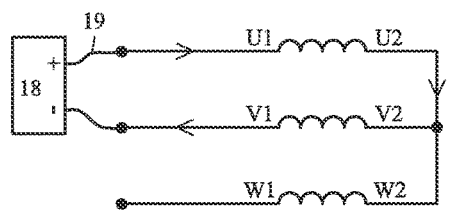

With reference to FIGS. 2 and 3, the DC voltage applying device comprises a DC power source 18 and a pair of connection cables 19 extending from positive and negative terminals of the DC power source 18 respectively. The cables 19 can be connected across one phase of windings or two phases of windings of the three-phase windings 7 so that a direct current can flow these windings from the DC power source 18 to generate a static magnetic field.

As an example, FIG. 2 shows the three-phase (U, V, W) windings 7 in a star connection configuration, outer and inner ends of each phase of windings being represented by (U1, U2), (V1, V2) and (W1, W2). The inner ends of the three-phases are connected together. By connecting the cables 19 across any one phase (illustrated as U phase) of windings and by applying a direct current from the DC voltage applying device through this phase, that is, applying a DC voltage across this phase, a static magnetic field is generated in the electric machine. As another example, FIG. 3 also shows the three-phase (U, V, W) windings 7 in star connection configuration, but the cables 19 are connected across any two phases (illustrated as the U phase and V phase) windings in series. When the DC voltage applying device applies a direct current through the two phases, that is, applying a DC voltage across the two phases, a static magnetic field is generated in the electric machine. Other manners of connecting the connection cables 19 across one phase of windings or two phases of windings (in series or in parallel) of the three-phase windings 7 (coupled either in star connection configuration or in delta connection configuration) can also be used here.

During a process of assembling the resolver rotor 13 to the machine shaft 4, relative angular orientation of the machine shaft 4 is achieved under the action of the static magnetic field thus generated. Then, in this angular orientation of the machine shaft 4, the resolver rotor 13 is fixed to the machine shaft 4.

Figure 4:
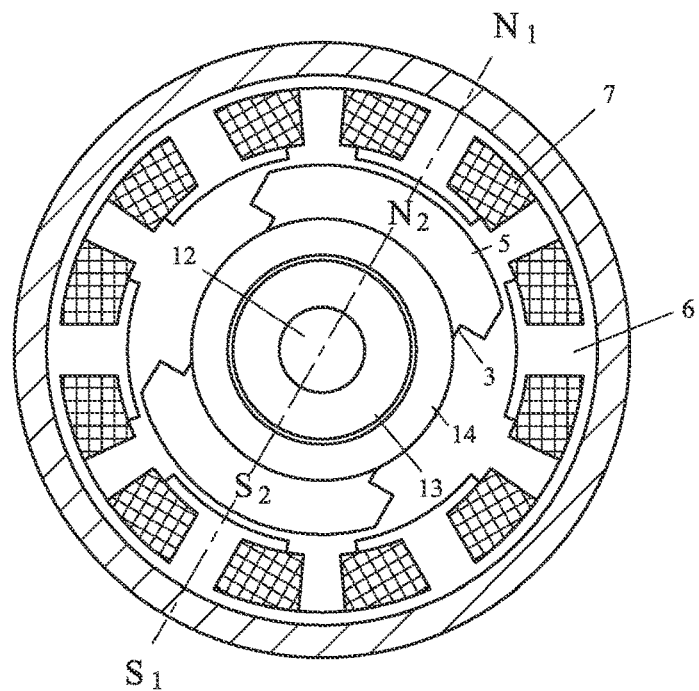
FIG. 4 is a schematic view showing a machine shaft located under the action of a static magnetic field generated by a DC voltage applied to windings of the rotary machine.

As schematically shown in FIG. 4, when a DC voltage is applied across any one or two phases of windings on the machine stator 6, a static magnetic field is generated in and through the electric machine. This static magnetic field has at least one pair of opposite poles N1, S1 with unchanged angular positions. Under the action of this static magnetic field, the machine rotor 3 will rotate freely and automatically to an angular position where an N-S direction of the pair of magnets 5 of the machine rotor 3 is aligned with an N-S direction of the static magnetic field and stay stably in this angular position. In other words, two poles of a magnetic field generated by the pair of magnets 5 of the machine rotor 3 are aligned with the two poles of the static magnetic field (i.e., opposite poles N2, S2 of the magnetic field generated by the pair of magnets 5 of the machine rotor 3 are aligned with poles N1, S1 of the static magnetic field).

It should be noted that, in some configurations of the electric machine, the static magnetic field generated under the DC voltage may have more than one pair of opposite poles N1, S1. In this condition, the poles N2, S2 of the magnetic field generated by the pair of magnets 5 of the machine rotor 3 will come to be aligned with one pair of poles N1, S1 of the static magnetic field. That is to say, when the static magnetic field is generated, the N-S direction of one pair of magnets 5 of the machine rotor 3 must come to be aligned with an N-S direction of the static magnetic field.

By maintaining the applied DC voltage uninterrupted, the machine rotor 3 is kept stably in this angular position by the static magnetic field without further rotation. In the state that the machine rotor 3 is kept stably by the static magnetic field, the resolver rotor 13 is assembled to the machine shaft 4 so that correct angular orientation between the machine shaft 4 and the resolver rotor 13 is ensured.

It is understood that the electric resistance in the windings of the rotary machine is very small, so a resistor may be added in one or each of the cables 19 for preventing any over-strong current to be generated in the windings connected between the cables 19 when the DC voltage applying device applies a direct current through windings. The windings can be protected by using one or more resistors added in one or each of the cables 19. The output voltage of the DC power source 18 can be determined by experiments or by experience such that the output voltage can keep the machine rotor 3 stably inside the static magnetic field without any further rotation. Optionally, the DC power source 18 has an adjustable output voltage, which can be adjusted in situ so that the static magnetic field is sufficient to keep the angular position of the machine rotor 3.

The assembling tool further comprises a pressing device for press-fitting the resolver rotor 13 to the machine shaft 4. In the assembling process, the pressing device is arranged in a fixed position with respect to the machine casing.

Figure 5:
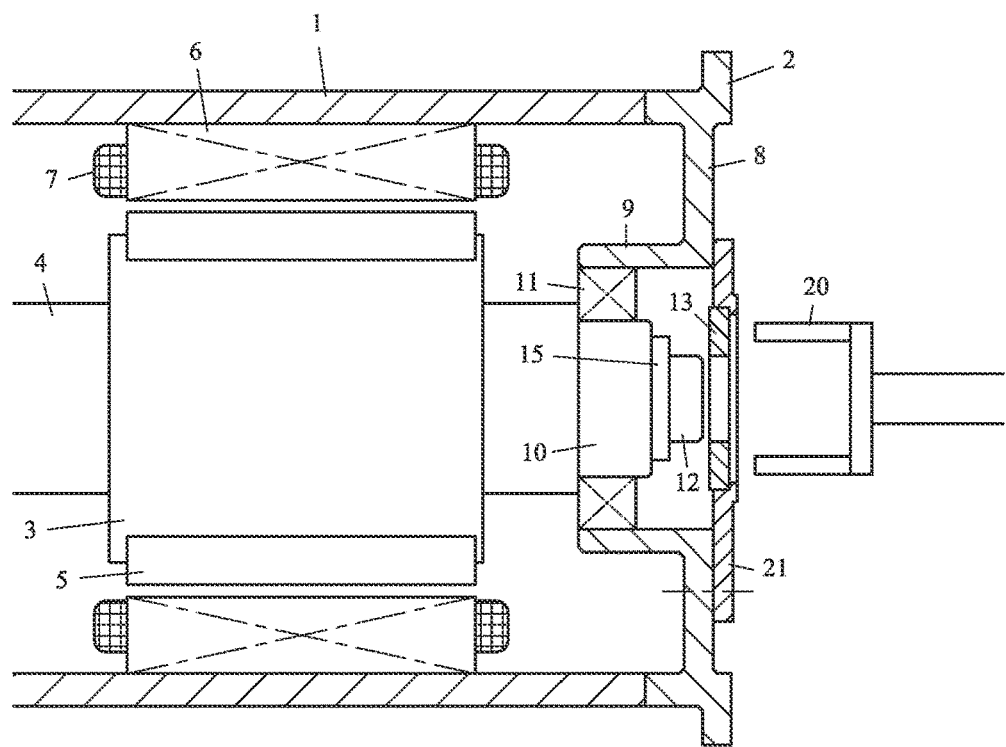
FIG. 5 is a schematic sectional view of a process of press-fitting a resolver rotor to a machine shaft by using an assembling tool of the disclosure.

In an example shown in FIG. 5, the pressing device comprises a push bar 20 which is driven axially by an actuator (not shown), for example, a hydraulic actuator, and a seat 21 configured to fix the resolver rotor 13 with respect to the machine casing.

The seat 21 may be a plastic member which can be molded onto the resolver rotor 13 and can be locked to the casing of the electric machine. The seat 21 may be a disposable member, which is disposed after use. Alternatively, the seat 21 is a member that can be reused. In either case, the seat 21 comprises a feature to keep the resolver rotor 13 in a predetermined angular orientation so that the resolver rotor 13 is kept in a predetermined correct angular orientation with respect to the casing.

In an example shown in FIG. 5, the end cover 2 of the casing has been assembled to the cylindrical portion 1, and the seat 21 is temporarily locked to the end cover 2, for example, by screws or clamps, in a predetermined angular orientation.

The push bar 20 faces axially towards the resolver rotor 13 which is kept by the seat 21 that is locked to the casing of the electric machine. The push bar 20 may be a single hollow bar or comprise a plurality of bars distributed uniformly in a circumferential direction.

In the state that the machine shaft 4 is kept in a correct angular orientation under the action of the static magnetic field generated by the DC voltage applied by the DC voltage applying device, the push bar 20 is actuated by the actuator (not shown) so that the push bar 20 pushes the resolver rotor 13 axially towards the machine shaft 4. The resolver rotor 13 is moved out from the seat 21 and is pushed by the push bar 20 onto the end segment 12 until the resolver rotor 13 is biased against the shoulder 15. Now the resolver rotor 13 is press-fitted to the end segment 12 so that the resolver rotor 13 is fixed to the end segment 12 by interference fit and correct angular orientation between the resolver rotor 13 and the machine rotor 3 is achieved.

After the resolver rotor 13 is press-fitted onto the end segment 12, the DC voltage applying device stops to apply the DC voltage and the seat 21 is removed from the casing.

Then, the resolver stator 14 (not shown in FIG. 5) is assembled into the end cover 2 in a predetermined angular orientation which is ensured by an alignment feature (poka-yoke design) provided between them. The alignment feature may comprise marks, convex-concave fitting features or the like provided on the resolver stator 14 and the end cover 2.

Then, the cover plate 16 is fixed to the plate portion 8 to seal the resolver inside the tubular portion 9.

The structure of the pressing device is not limited to that illustrated in FIG. 5. The pressing device may comprise any suitable structure that can press the resolver rotor 13 axially onto the machine shaft 4

For example, in an alternative embodiment not shown here, when the resolver rotor 13 is assembled onto the machine shaft 4, the end cover 2 has not been assembled to the cylindrical portion 1 yet. In this case, the seat 21 is fixed to the cylindrical portion 1 in a corrected angular orientation (not fixed to the end cover 2 as shown in FIG. 5). Then, the resolver rotor 13 is press-fitted onto the end segment 12, and then the end cover 2, with the resolver stator 14 mounted inside it, is assembled to the cylindrical portion 1.

Further, the seat 21 may have any suitable shape as long as it can be fixed to the casing of the electric machine and has a feature for keeping the resolver rotor 13 in a predetermined angular orientation with respect to the casing.

Furthermore, the structures of the assembling tool and the electric machine (including the structure of the resolver) shown in the figures are all illustrative, not exclusive. Under the concept of the disclosure, that is, press-fitting the resolver rotor axially onto machine shaft in a state that the machine rotor is angularly orientated by the action of a static magnetic field generated by windings of the machine stator, a skilled person in the art can design any suitable structures for the assembling tool and the electric machine (including the resolver).

The disclosure also provides a method for assembling a resolver of an electric machine. The method mainly comprises the steps of:
(a) applying a DC voltage across at least one phase of windings of three-phase windings of the electric machine to create a static magnetic field by a DC electric current flowing through the at least one phase of windings, and the static magnetic field forces a machine rotor of the electric machine to rotate freely to an angular orientation where an N-S direction of a pair of magnets of the machine rotor is aligned with an N-S direction of the static magnetic field and keeps the machine rotor stably in this angular orientation;
(b) pushing a resolver rotor of the resolver onto a machine shaft of the electric machine in an axial direction in a state that the machine rotor is kept in the above angular orientation by the static magnetic field; and
(c) assembling a resolver stator of the resolver into a casing (in particular an end cover of the casing) of the electric machine in a predetermined angular orientation to a position surrounding the resolver rotor, the predetermined angular orientation of the resolver stator being ensured by an alignment feature (poka-yoke design) provided between the resolver stator and the casing (in particular the end cover of the casing).

The assembling method of the disclosure can be performed by using the assembling tool described above, and all features described above with reference to the assembling tool and the electric machine are applicable in the assembling method of the disclosure.

According to the resolver assembling technique, the resolver rotor is press-fitted onto the machine shaft without any key coupling structure or other form fit structure therebetween so it does not need a key groove or other form fit structure to be formed on each of the resolver rotor and the machine shaft. Further, the number of links of tolerance chain is decreased due to the cancellation of the key coupling structure or other form fit structure, which results in increasing the sensing accuracy of the angular position. Furthermore, angular orientation of the machine shaft is achieved under the action of a static magnetic field generated by a DC voltage applied to the windings of the rotary machine, high precision of the relative angular position between the machine shaft and the resolver rotor can be ensured and sensing accuracy of the angular position can be additionally increased.

In addition, by dispensing of the key coupling structure or other form fit structure between the resolver rotor and machine shaft, operation performance of the electric machine can be improved. Specifically, rotational symmetry of the assembly of the resolver rotor and the machine shaft is generally negatively affected by the key coupling structure or other form fit structure. Rotational asymmetry may cause shaking, noise and other problems when the electric machine operates at a high speed. By cancelling the key coupling structure or other form fit structure according to the disclosure, rotational symmetry of the assembly of the resolver rotor and the machine shaft is improved, which contributes to high stability and low noise when the electric machine operates at a high speed.

While certain embodiments have been described, these embodiments have been presented by way of example only, and are not intended to limit the scope of the disclosure. The attached claims and their equivalents are intended to cover all the modifications, substitutions and changes as would fall within the scope of the disclosure.

The invention claimed is:

1. A tool for assembling a resolver of an electric machine, said electric machine comprising a casing, a machine rotor, a machine shaft, a machine stator comprising three-phase windings and a resolver that comprises a resolver rotor and a resolver stator, said tool comprising:
a DC voltage applying device configured to apply a DC voltage across at least one phase of windings of the three-phase windings to create a static magnetic field by a DC electric current flowing through the at least one phase of windings, the static magnetic field being able to force the machine rotor to rotate to an angular orientation where an N-S direction of magnets of the machine rotor is aligned with an N-S direction of the static magnetic field and to keep the machine rotor stably in the angular orientation; and a pressing device configured to push the resolver rotor onto the machine shaft in an axial direction in a state that the machine rotor is kept in the angular orientation by the static magnetic field.

2. The assembly tool of claim 1, the DC voltage applying device comprising a DC power source and connection cables extending from the DC power source, the connection cables being configured to be connected across at least one phase of windings of the three-phase windings to apply the DC voltage across the at least one phase of windings.

3. The assembly tool of claim 2, the DC voltage applying device being configured to cut off the DC voltage after the resolver rotor is fixed to the machine shaft.

4. The assembly tool of claim 1, the pressing device comprising:
a seat configured to be fixed to the casing and comprising a feature to keep the resolver rotor inside it in a predetermined angular position; and
a push bar arranged to face towards the resolver rotor and configured to move in the axial direction to push the resolver rotor onto the machine shaft.

5. The assembly tool of claim 4, the seat being molded to the resolver rotor and being locked temporarily to the casing with the resolver rotor, and the resolver rotor being configured to be pushed out from the seat by the push bar.

6. A method for assembling a resolver of an electric machine, said electric machine comprising a casing, a machine rotor, a machine shaft, a machine stator comprising three-phase windings and a resolver that comprises a resolver rotor and a resolver stator, said method comprising the steps of:
(a) applying a DC voltage across at least one phase of windings of the three-phase windings to create a static magnetic field by a DC electric current flowing through the at least one phase of windings of the three-phase windings, and the static magnetic field forcing the machine rotor to rotate to an angular orientation where an N-S direction of magnets of the machine rotor is aligned with an N-S direction of the static magnetic field and keeping the machine rotor stably in this angular orientation;
(b) pushing the resolver rotor onto the machine shaft in an axial direction and forming press-fitting between the resolver rotor and the machine shaft in a state that the machine rotor is kept in the angular orientation by the static magnetic field; and
(c) assembling the resolver stator into the casing in a predetermined angular orientation to a position surrounding the resolver rotor, the predetermined angular orientation of the resolver stator being ensured by an alignment feature provided between the resolver stator and the casing.

7. The method of claim 6, the alignment feature comprising a poka-yoke design.

8. An electric machine comprising:
a casing;
a machine shaft;
a machine rotor fixedly carried by the machine shaft, the machine rotor comprising one or more magnets;
a machine stator arranged in the casing surrounding the machine rotor, the electric machine stator comprising three-phase windings; and
a resolver comprising a resolver rotor fixed to the machine shaft and a resolver stator fixedly mounted to the casing and surrounding the resolver rotor, the resolver being assembled through the following steps:
(a) applying a DC voltage across at least one phase of windings of three-phase windings to create a static magnetic field by a DC electric current flowing through the at least one phase of windings of the three-phase windings, the static magnetic field forcing the machine rotor to rotate to an angular orientation where an N-S direction of the magnets of the machine rotor is aligned with an N-S direction of the static magnetic field and keeping the machine rotor stably in this angular orientation; and
(b) pushing the resolver rotor onto the machine shaft in an axial direction and forming press-fitting between the resolver rotor and the machine shaft in a state that the machine rotor is kept in the angular orientation by the static magnetic field;
wherein the resolver stator is assembled into the casing in a predetermined angular orientation to a position surrounding the resolver rotor, the predetermined angular orientation of the resolver stator being ensured by an alignment feature provided between the resolver stator and the casing.

9. The electric machine of claim 8, the electric machine being an electric motor or an electric generator.

10. The electric machine of claim 8, the alignment feature comprising a poka-yoke design.

11. The electric machine of claim 8, the casing comprising a cylindrical portion and an end cover fixed to the cylindrical portion, the end cover comprising a plate portion and a tubular portion, and the resolver stator being assembled in the tubular portion.

12. The electric machine of claim 8, wherein no form fit structure is provided between the machine shaft and the resolver rotor.

* * * * *